(12) United States Patent
Dias et al.

(10) Patent No.: US 7,913,156 B2
(45) Date of Patent: Mar. 22, 2011

(54) RICH MEDIA EVENT PRODUCTION SYSTEM AND METHOD INCLUDING THE CAPTURING, INDEXING, AND SYNCHRONIZING OF RGB-BASED GRAPHIC CONTENT

(75) Inventors: James Dias, Madison, WI (US); Shankara Subranmanian, Madison, WI (US)

(73) Assignee: Sonic Foundry, Inc., Madison, WI (US)

( * ) Notice: Subject to any disclaimer, the term of this patent is extended or adjusted under 35 U.S.C. 154(b) by 775 days.

(21) Appl. No.: 11/564,061

(22) Filed: Nov. 28, 2006

(65) Prior Publication Data

US 2007/0089058 A1 Apr. 19, 2007

Related U.S. Application Data

(63) Continuation of application No. 10/702,064, filed on Nov. 5, 2003, now Pat. No. 7,149,973.

(51) Int. Cl.
*G06F 17/00* (2006.01)

(52) U.S. Cl. .................................. 715/203; 715/201

(58) Field of Classification Search .................. 715/201, 715/202, 203, 204
See application file for complete search history.

(56) References Cited

U.S. PATENT DOCUMENTS

| | | | |
|---|---|---|---|
| 5,506,954 A | | 4/1996 | Arshi et al. |
| 5,528,309 A | * | 6/1996 | Nguyen ........................ 348/587 |
| 5,621,428 A | * | 4/1997 | King et al. .................... 345/641 |
| 5,757,967 A | | 5/1998 | Gonzales et al. |
| 5,758,094 A | | 5/1998 | Goettsch |
| 5,801,685 A | | 9/1998 | Miller et al. |
| 5,859,979 A | | 1/1999 | Tung et al. |
| 5,978,857 A | | 11/1999 | Graham |
| 5,987,166 A | * | 11/1999 | Hayashi et al. ............... 382/163 |
| 5,990,879 A | | 11/1999 | Mince |
| 6,230,209 B1 | * | 5/2001 | Zenda ........................... 709/247 |
| 6,360,202 B1 | | 3/2002 | Bhadkamkar et al. |
| 6,366,914 B1 | | 4/2002 | Stern |
| 6,389,473 B1 | | 5/2002 | Carmel et al. |
| 6,397,230 B1 | | 5/2002 | Carmel et al. |
| 6,421,094 B1 | * | 7/2002 | Han .............................. 348/569 |
| 6,628,299 B2 | * | 9/2003 | Kitayama ..................... 345/635 |
| 6,665,006 B1 | * | 12/2003 | Taguchi ..................... 348/211.1 |
| 6,665,835 B1 | | 12/2003 | Gutfreund et al. |
| 6,715,100 B1 | * | 3/2004 | Hwang ............................ 714/5 |
| 6,728,753 B1 | | 4/2004 | Parasnis et al. |
| 6,738,424 B1 | * | 5/2004 | Allmen et al. ........... 375/240.08 |
| 6,744,931 B2 | * | 6/2004 | Komiya et al. ............... 382/284 |

(Continued)

OTHER PUBLICATIONS

Lindermann et al., FliMax, a Novel Stimulus Device for Panoramic and Highspeed Presentation of Behaviourally Generated Optic Flow, Google 2003, pp. 779-791.*

(Continued)

*Primary Examiner* — Cong-Lac Huynh
(74) *Attorney, Agent, or Firm* — Foley & Lardner LLP

(57) ABSTRACT

A rich media event production method and system including the capturing, indexing, and synchronizing of RGB-based graphic content. The method includes capturing audio and video during an event production; capturing graphical content during the event production from an RGB source device; indexing and synchronizing the captured audio, video, and graphical content during the event production; and communicating the audio, video, and graphical content over a network for presentation at a computer coupled to the network during or after the event production as selected by a user of the computer.

20 Claims, 4 Drawing Sheets

U.S. PATENT DOCUMENTS

| | | | |
|---|---|---|---|
| 6,850,259 B1* | 2/2005 | Rzepkowski et al. | 715/835 |
| 6,976,229 B1 | 12/2005 | Balabanovic et al. | |
| 7,064,783 B2* | 6/2006 | Colavin et al. | 348/231.3 |
| 7,380,206 B1* | 5/2008 | Usuda | 715/236 |
| 7,403,206 B1* | 7/2008 | Liu et al. | 345/594 |
| 2001/0020954 A1 | 9/2001 | Hull et al. | |
| 2002/0048400 A1* | 4/2002 | Leedham et al. | 382/167 |
| 2002/0056082 A1 | 5/2002 | Hull et al. | |
| 2002/0078093 A1* | 6/2002 | Samaniego et al. | 707/513 |
| 2002/0091905 A1* | 7/2002 | Geiger et al. | 711/170 |
| 2002/0158865 A1* | 10/2002 | Dye et al. | 345/419 |
| 2002/0175991 A1 | 11/2002 | Pflaum et al. | |
| 2003/0074536 A1* | 4/2003 | Nomizo et al. | 711/163 |
| 2003/0103670 A1* | 6/2003 | Schoelkopf et al. | 382/162 |
| 2003/0176768 A1* | 9/2003 | Gono et al. | 600/109 |
| 2003/0178556 A1* | 9/2003 | Tachi et al. | 250/227.11 |
| 2003/0193566 A1* | 10/2003 | Matsuda et al. | 348/189 |
| 2003/0202004 A1 | 10/2003 | Lin | |
| 2004/0150648 A1* | 8/2004 | Kim et al. | 345/581 |
| 2005/0044499 A1 | 2/2005 | Allen et al. | |
| 2005/0073578 A1* | 4/2005 | Odlivak et al. | 348/65 |
| 2005/0104969 A1* | 5/2005 | Schoelkopf et al. | 348/207.99 |
| 2005/0251732 A1* | 11/2005 | Lamkin et al. | 715/500.1 |
| 2006/0200751 A1* | 9/2006 | Underwood et al. | 715/501.1 |
| 2007/0091124 A1* | 4/2007 | Hasegawa et al. | 345/629 |

OTHER PUBLICATIONS

Bradnam et al., A Personal Computer-based Visual Evoked Potential Stimulus and Recording System, Google 1994, pp. 81-93.*
Li et al., A PC-based Distributed Multiple Display Virtual Reality System, Google 2001, pp. 177-181.*
Ozeki et al., Tracking Hands and Objects for an Intelligent Video Production System, IEEE 2002, pp. 1011-1014.*
Lombeyda et al., Scalable Interactive Volume Rendering Uing Off-the-shelf Components, Google 2001, pp. 1-9.*
Voyatzis et al., A System for Capturing High Resolution Images, Google 1998, pp. 1-5.*
Cuevas et al., Computer Vision using MatLAB and the Toolbox of Image Processing, Google 2003, pp. 1-27.*
Baecker et al., The ePresence Interactive Webcasting and Archiving System: Technology Overview and Current Research Issues, Google 2004, pp. 1-6.*
Press release, "Sonic Foundry Ships Next Generation Mediasite Live Rich Media Web presentation System" Oct. 21, 2002.
Press release, "Presentations with MediaSite Live: Transporting Bits Instead of Humans" Oct. 22, 2002.
Web pages from www.pinnaclesys.com regarding StreamGenie Presenter, printed Feb. 5, 2004.
Web pages from www.winnov.com regarding Cbox, printed Feb. 5, 2004.
Web pages from www.tegrity.com regarding Tegrity WebLearner, printed Feb. 5, 2004.
Web pages from www.microsoft.com regarding Producer 2003, printed Feb. 5, 2004.
Web pages from www.anystream.com regarding Anystream Agility, printed Feb. 5, 2004.
Web pages from www.lotus.com regarding IBM Lotus Virtual Classroom, printed Feb. 5, 2004.
Web pages from www.sgi.com regarding Kasena MediaBase, printed Feb. 5, 2004.
Web pages from www.globalstream.com regarding GlobeCaster Studio 8000, printed Feb. 5, 2004.
Web pages from www.emblaze.com regarding EMstudio, EMcoder, EMplatform and EMplayer, printed Feb. 5. 2004.

* cited by examiner

RICH MEDIA EVENT PRODUCTION SYSTEM AND METHOD INCLUDING THE CAPTURING, INDEXING, AND SYNCHRONIZING OF RGB-BASED GRAPHIC CONTENT

FIELD OF THE INVENTION

The present invention relates to rich media presentation systems. More particularly, the present invention relates to a rich media event production system and method including the capturing, indexing, and synchronizing of RGB-based graphic content.

BACKGROUND OF THE INVENTION

The Internet has been used to facilitate presentations. Previous systems have included the capability of presenting over the Internet audio and video of a presenter delivering a presentation. Previous systems have also coordinated the simultaneous delivery of presentation slides or graphics along side the audio and video of the presenter, using programs such as PowerPoint available from Microsoft Corporation of Redmond, Wash. Some of these previous systems have even allowed audience feedback and participation.

For example, the StreamGenie Presenter product available from Pinnacle Systems, Inc. of Mountain View, Calif. allows the use of multiple cameras and switching between different cameras. The StreamGenie Presenter product also provides for simultaneous Real Networks and Windows Media encoding; professional titling, graphics, and 3D effects. It requires additional software for PowerPoint integration and an advanced copy of PowerPoint slides. As a result, the StreamGenie Presenter product requires a high degree of authoring and pre-production processing.

The WebLearner product available from Tegrity, Inc. of San Jose, Calif. includes the hardware and software you need to automatically create and deliver e-learning classroom teaching. Features of the WebLearner product include synchronizing audio and video with slides, writing and drawing annotations synchronized with presenter voice data, a moving pointer created automatically from instructor's laser pointer on projected slides, screen recordings of application demos integrated with a presentation, and automatically generated indexing of slides and instructor activity along with links to online resources. However, the WebLearner product is complicated and difficult for presenters to use and requires a great deal of authoring and pre-production processing.

Yet another example is the CommuniCast 1000 product available from e-StudioLIVE of Tewksbury, Mass. This product creates a webcast in real-time for interactive live or on-demand viewing. Users attach a camera and microphone to the system and use the system to automate pre-production, presentation and delivery of webcast presentations. Like the other example products discussed, the CommuniCast 1000 requires a high degree of authoring and pre-production processing.

Conventional systems either work exclusively with programs, such as Microsoft's PowerPoint, to pre-process and stage graphics before an event or graphic content is attached after the event. Indeed, conventional rich media presentation systems lack the ability to capture and include graphic content with the video stream during an event. There is a need for a rich media event production system and method that includes the capturing, indexing, and synchronizing of RGB-based graphic content.

SUMMARY OF THE INVENTION

An exemplary embodiment relates to a rich media event production method including the capturing, indexing, and synchronizing of RGB-based graphic content. The method includes capturing audio and video during an event production; capturing graphical content during the event production from an RGB source device; indexing and synchronizing the captured audio, video, and graphical content during the event production; and communicating the audio, video, and graphical content over a network for presentation at a computer coupled to the network during or after the event production as selected by a user of the computer.

Another exemplary embodiment relates to a rich media event production system including the capturing, indexing, and synchronizing of RGB-based graphic content. The system includes a capture station and a presentation server. The capture station is configured to synchronize audio, video, and graphical content from an event presentation. The graphical content is obtained during the event production from an RGB source. The presentation server is coupled to the capture station via a network and is configured to make the audio, video, and graphical content available on the Internet.

Another exemplary embodiment relates to a rich media event production capture apparatus configured to capture and synchronize audio, video, and graphical content from an event presentation during the event presentation. The apparatus includes a video capture component configured to obtain video from the event presentation, an audio capture component configured to obtain audio from the event presentation, and a secondary channel capture component configured to obtain graphical content during the event presentation.

DETAILED DESCRIPTION OF THE EXEMPLARY EMBODIMENTS

Figure 1:
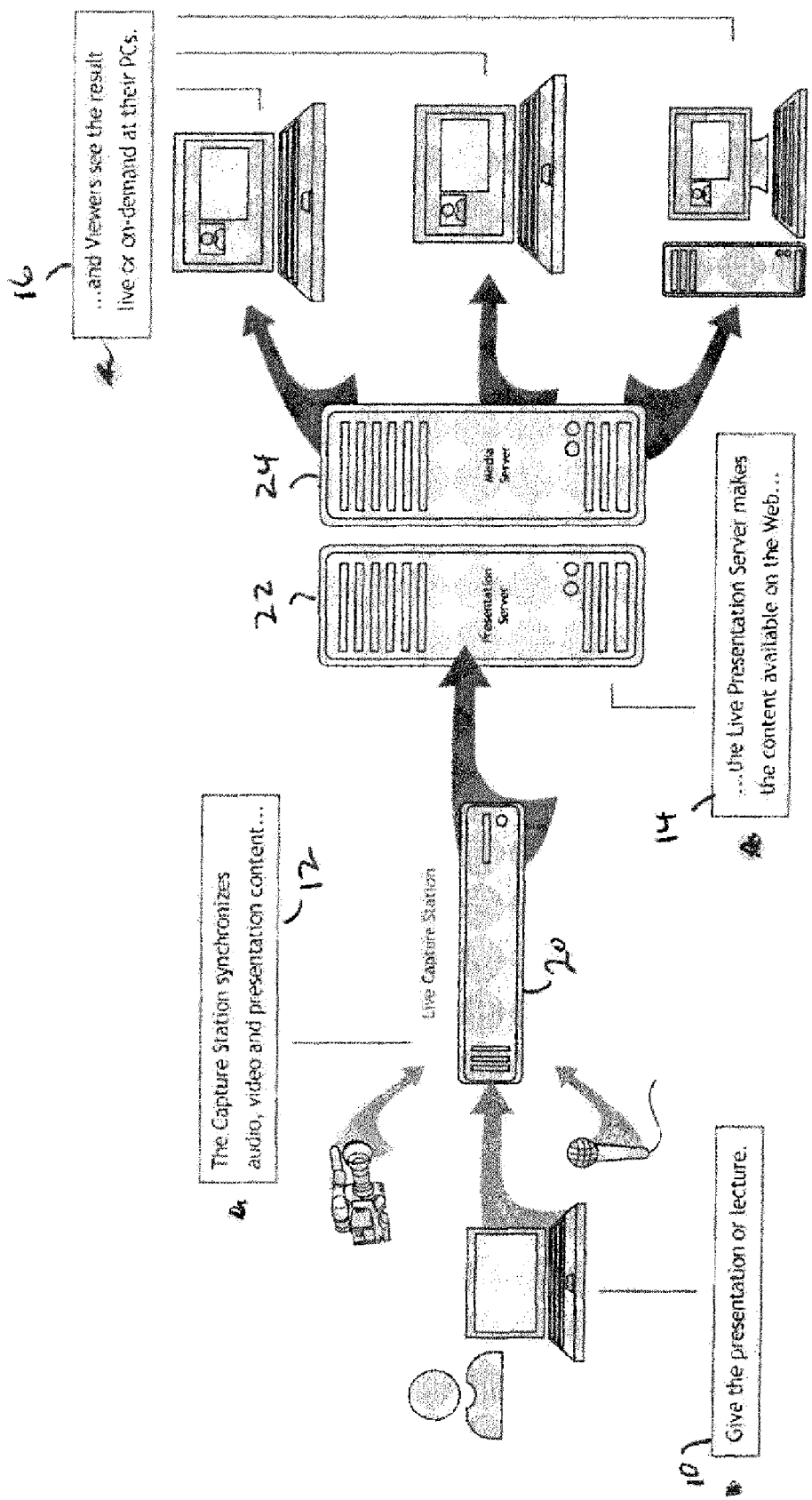
FIG. 1 is a diagrammatical representation of a presentation system including the capturing, indexing, and synchronizing of RGB-based graphic content in accordance with an exemplary embodiment.

FIG. 1 illustrates a presentation system in which a presenter gives a presentation or lecture in an operation 10; a capture station 20 synchronizes the audio, video, and presentation content in an operation 12; a presentation server 22 makes the content available on a network, such as the Internet, in an operation 14; and viewers see the result live or on demand at computers coupled to the network via a media server 24 in an operation 16. The capture station 20 can be a personal computer, a computer workstation, a dedicated application machine, or any of a variety of other computing devices. The capture station 20 is equipped with hardware to capture images and video. The presentation server 22 can be a web server machine.

In an exemplary embodiment, the presentation system includes an administration module, a capture module, a viewer module, and an control module. These modules can be installed on separate machines that are coupled to the same network. For example, the administration module and the viewer module can be installed as web applications on the presentation server 22. The control module can be installed as a service on the media server 24. The presentation server 22 also can serve as an image server for storing and serving captured images.

The capture module can be included as a bundled software application included with the capture station 20 or the capture module can be a separate software application that is loaded onto a computer.

The administration module in the presentation server 22 manages configurations for an encoder and viewer. The administration module and viewer modules manage application specific program (ASP) pages. A start page for the administration module points to a page managing web presentations. A list of web presentations is displayed on this page. Each presentation is administered as a web site on the presentation server 22. Administrators of the presentation server 22 can configure settings for a new web presentation.

Each web presentation includes properties, such as a web site name on which a presentation is hosted, a presentation title, an event name, a speaker name, a presentation description, a presentation date, a start time, an end time, a time-zone, a streaming profile of audiences who can view the presentation, a navigator template to be used, a high resolution image size (i.e., the maximum size of the slide image stored for the presentation), a presentation mode (i.e., whether the presentation is a live or/and on-demand presentation, whether a local archive of the presentation on the encoder machine needs to be created), a feature to allow audience polling and viewer questions in the live mode, and a feature to enable a presentation for replay immediately after upload when on-demand mode is selected.

The administration module in the presentation server 22 allows system administrators to configure the presentation server 22, the media server 24, and a FTP server. Images can be transported to the presentation server 22 using FTP. The FTP server may be remote or local. System Administrators have access to these servers and need to configure these servers for web presentations to be hosted. Configuration includes public IP's for the presentation server 22 and the media server 24, username, password and physical paths to the presentation server 22 and the FTP server.

Username, password, port, and publishing point information for the media server 24 in the Webcast scenario can be set up by using the Auto-Registration Service. Auto-registering requires an Auto-Registration Port; Domain Name, Username and Password for a look-up when the encoder initiates a request to communicate with the Auto-registration service; and a publishing point protocol that is used to deliver video from the publishing point to the clients. Further set up is accomplished by defining a custom URL and manually setting up the publishing point on the media server 24. When creating a multicast, the custom URL points to the presentation server 22 and not the media server 24.

The administration module can further be configured with a replay video URL and replay video upload information for an on-demand scenario. The video for replay can be copied using file copy to a network folder on a media server, or the video for replay can be copied over FTP to a folder on a media server.

The administration module further allows web administrators to create customized streaming profiles for different audiences and to add customized banners. Customized banners are constructed using a blank template where each template consists of the following sections: Template Information comprising the template name and description, Navigator Design including Image sources and URL links for the title banner, the ad banner, and the vendor logo; an image source for the image to be displayed in the video window for "Audio-Only" presentations; Speaker Information including speaker image source and URL links to speaker's biography and any collateral information; and presentation Status Images.

The following lists are displayed through the Administration module: a list of web presentations a list of streaming profiles, and a list of navigator templates.

The capture module in the capture station 20 includes an application that is used to capture and encode video, capture images, and synchronize images with the video. The capture process includes choosing a configuration from the server or choosing a configuration available at some location. The configuration specifies presentation details and the locations where the capture station 20 outputs the video and images. The configuration also specifies the presentation type, whether it is an on-demand presentation, a live presentation or both. If it is a live presentation that also needs hosting for on-demand, then the configuration specifies the upload location for storing the captured video.

The capture station 20 communicates with the presentation server 22 to obtain a list of presentations. A presentation can be selected by a user from the list of presentations returned. This action returns the selected configuration file for the presentation chosen. The configuration is stored in the presentation's configuration folder on the presentation server 22.

Figure 2:
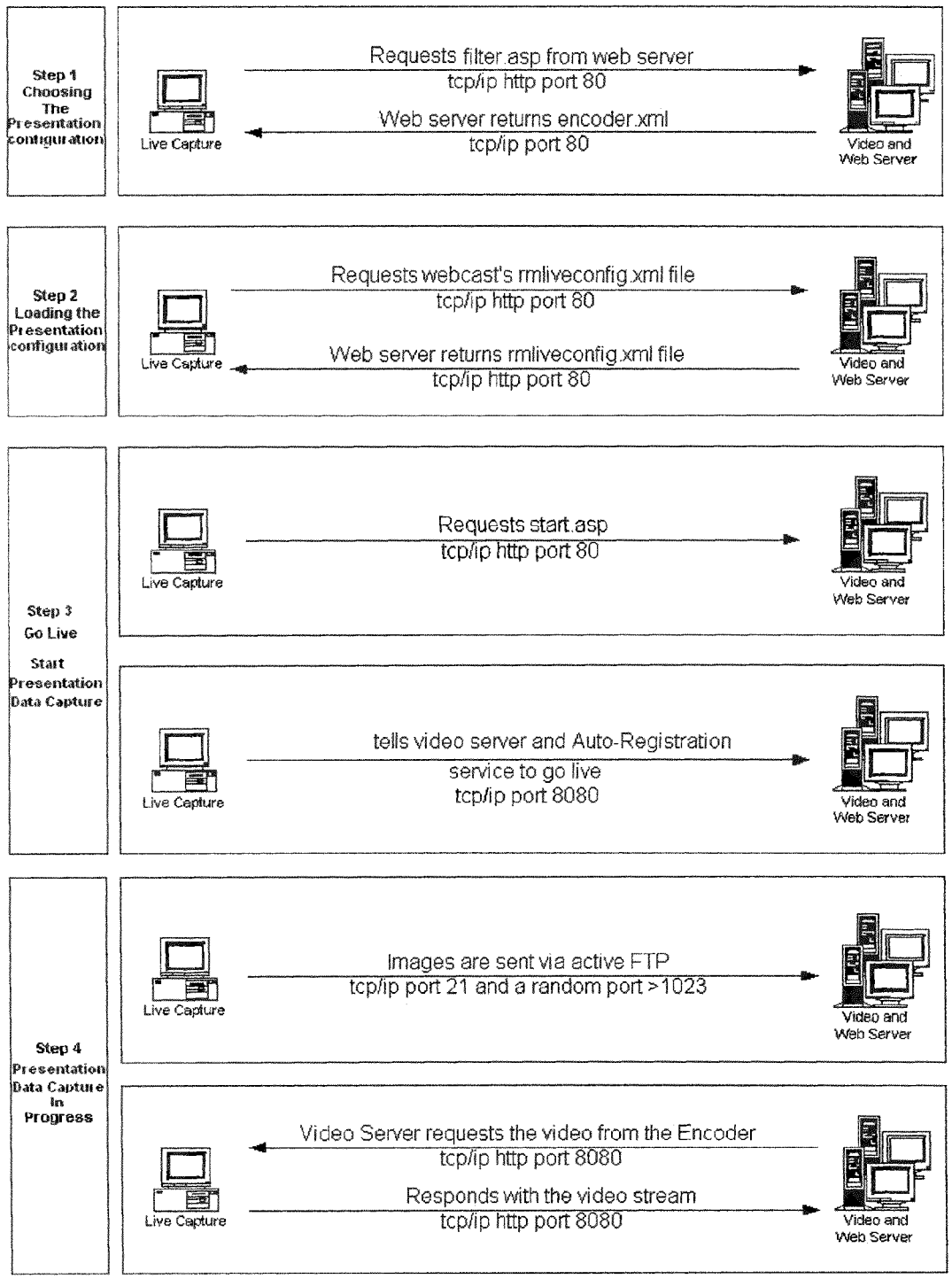
FIG. 2 is a diagrammatical representation of communication between the capture station and the presentation server and media server in the presentation system of FIG. 1.

FIG. 2 illustrates a communication sequence between the capture station 20 and the presentation server 22 and media server 24. In an operation 1, the presentation configuration is chosen with a request from the capture station 20 to the presentation server 22. In an operation 2, the selected presentation configuration is loaded.

In an operation 3, the presentation data capture starts. A start request is sent from the capture station 20 to the presentation server 22. The capture station 20 communicates with the media server 24 to engage an auto-registration service.

In an operation 4, the presentation data capture is in progress as images are sent from the capture station 20 to the presentation server 22 and media server 24. Also, video can be requested by the media server 24.

The capture station 20 captures the video through a video capture card for analog/digital video. In an exemplary embodiment, the capture station 20 encodes video to Windows Media Format using the Windows Media Encoder SDK. The format for encoding is specified in the configuration for a presentation. The capture station 20 creates an instance of the Windows Media Encoder on its machine.

The capture station 20 captures images from a digital source in RGB (red, green blue—the three colors of light which can be mixed to produce any other color. Colored images are often stored as a sequence of RGB triplets or as separate red, green, and blue overlays) form, using a VGA capture card such as Datapath's Vision RGB Pro.

Figure 3:
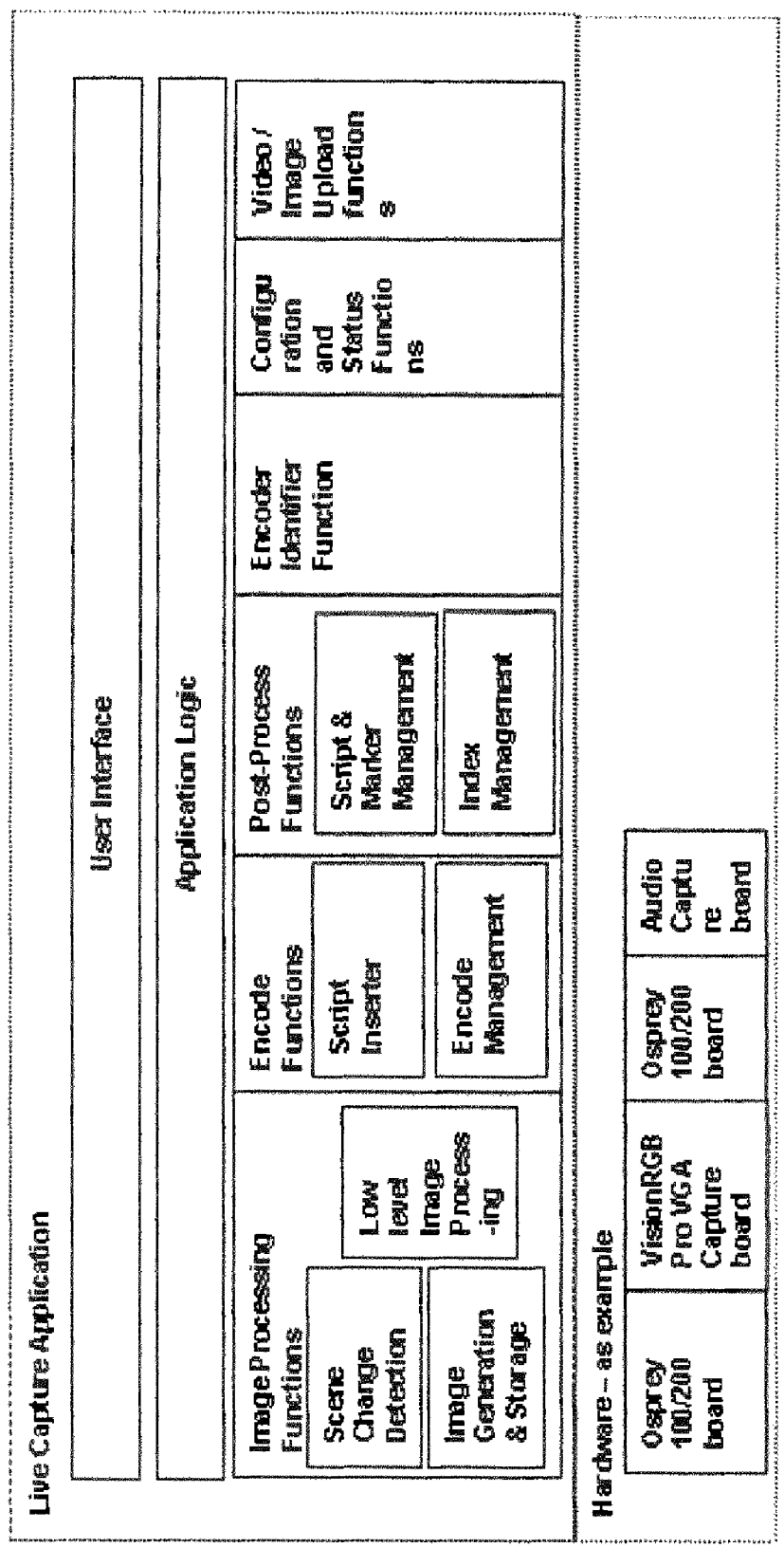
FIG. 3 is a diagrammatical representation of the functional architecture of a capture application in a capture station in the presentation system of FIG. 1.

FIG. 3 illustrates the functional architecture for the capture application in the capture station 20. The capture station 20 captures images from analog sources using a second Osprey card. The analog source can be fed directly into the Osprey card and images can be captured using the "Automatic Image Advance" feature that captures images once every few seconds. Alternatively, images can be captured from digital sources using a scan converter that converts a digital image to an analog image that can be fed into the Osprey Card.

The capture station 20 uses scene change detection as additional criteria when capturing images in the "Automatic Image Advance" feature. Scene change detection is used to ascertain if the image has actually changed or if it is the same image that was previously displayed. If the image has not changed, a new image is not captured in order to reduce the amount of data captured that will be transmitted over the network.

A presenter can decide to force images to be advanced manually using a user interface element like a button. The presenter uses this facility at any time during the encoding session. This is available even when the "Automatic Image Advance" feature is selected.

The capture station 20 generates three sets of images from the original captured image. The first set is a high resolution image, the size of which is specified in the configuration settings through the administrator module. The second image set is a smaller size image that is used by the Viewer to display the image. This image is generated from the high resolution image, by performing a down-scale operation. The third set is a thumbnail image that is used in the Slide List view that displays a list of slides in the Viewer view of the Navigator.

Communication between the capture station 20 and the server hosting the web presentation is done using HTTP. HTTP calls are used to execute ASP pages A separate page is called for every state. The capture station 20 stores a local copy of the video. This copy is used for upload when on-demand mode for a presentation is required.

Once the images are generated, they are copied over to the presentation server 22. A "windows media script" is inserted into the encoded windows media script stream for the second image set with a medium size, such as 500×374 pixels. The script contains the name of the image, its width and height. In the Live mode, a script is inserted every two (2) seconds. This is used by the Viewer to fetch the current slide image for viewers joining in late.

Once a Live presentation is completed, if the presentation is also marked for on-demand viewing, the following operations are performed to clean up the video. First, clean up scripts from the scripts and move them to the header. In the on-demand mode, a viewer can not join late so the scripts are removed from the script stream. Thus, after clean-up, the script stream does not contain any scripts. However, the scripts are maintained in the header for the media file. Second, markers are added during post-processing to the header for the media file. In the on-demand mode, navigation or seeking within the video file using the thumbnail images is allowed. Windows Media Markers are added for slide occurrences in time. Markers are always added to the Windows Media File Header. A marker is also inserted for the event mapping to "EndPresentation." The encoder waits for 60 seconds from the time the presenter actually stops the capture before actually stopping the encoding process.

In the on-demand mode, the scripts from the Windows Media File header are provided to the viewer. The events are trapped by the viewer, which in turn are used to get the next slide. In the on-demand mode, once the video file is post-processed, the video file is uploaded using FTP or local copy to the media server 24, as specified in the configuration. Images are uploaded to the presentation server 22 using FTP during the capture.

Video can be encoded to multiple bit rates simultaneously. A separate stream for each video encoded at a particular bit rate is created within the same video file. Multiple Bit Rate encoding is specified through the configuration process. The Live Administrator has a section called Streaming Profiles where this information can be defined. While creating a new presentation from the Live Administrator, the appropriate streaming profile is selected. The Windows Media player intelligently chooses the correct stream based on the bit rate selected.

Image Capture for digital sources takes place at the resolution of the device that is connected to the VGA capture card. When using analog image source, the capture takes place at either NTSC/PAL resolution, or the resolution set for the second Osprey Card serving for image capture. In an exemplary embodiment, the capture station 20 provides an image sharpening factor that is selectable through a slider control. This operation makes Text/Object in image more crisp or in other words edges of text/objects in the image are more clearly defined.

The encoding process used for images can be sequential or progressive. Sequential delivers an image all at once to the audience. Progressive delivers the image a little at a time to the audience. This reduces the size of the image. Real-time feedback of the image is displayed when changing any settings for image compression. The file size for the image is also displayed in real time.

The capture station 20 is able to send a "Placeholder Image" at any time. The Placeholder Image is a predefined image created before the presentation is presented and is selected by browsing the local capture computer or a networked computer accessible from the capture station 20. The "Placeholder Image" is used for signaling intermission or technical difficulties or the presentation is about to start when a presentation is being captured or about to be captured.

In the Live mode, when a presentation is setup as a Webcast, the capture station 20 communicates with the media server 24. The communication process is outlined as follows. The capture station 20 initiates a connection to the Auto-Registration Service on the media server 24. The capture station 20 provides a username, password, the capture machine's public IP Address, and the Unicast Publishing Point alias (obtained from the configuration for a presentation) to be created on the Windows Media Server. The publishing point on the video server is where the video stream is published by the Windows Media Encoder for a Live Webcast. In a Webcast, an independent connection exists between each viewer module and the media server for a presentation.

Once the publishing point is created, the video server makes an HTTP request for the video from the encoder. The Windows Media Encoder supports transferring of video stream to a publishing point using HTTP protocol.

In the Live mode, a web presentation can be configured for Multicast. The configuration settings for a presentation to be multicast must be set up manually and documented. A presentation setup is also available for viewing as a live unicast (Webcast). The following steps are performed manually before starting capture for a Live Multicast. First, while creating a multicast, a custom Live Video URL is entered. The URL points to a ".nsc" file on a web server (presentation server 22). This is provided through the configuration in the administration module. The capture station 20 provides a method to generate the stream format file. The stream format file is copied over to the media server 24.

A windows media station is created on the media server 24. The station path points to the ".nsc" file on a web server (as provided through the configuration in the administration module). The stream format file generated and copied in the earlier steps is added. A Media Program for the Multicast is created on the media server 24. A stream on the media server 24 is created to connect to the capture station 20.

The Control module in the media server 24 is used during a Live Webcast. The capture station 20 initiates communication over the network with the Control module. The capture station 20 provides a username, password, the capture station's public IP Address, and the Unicast Publishing Point alias (obtained from the configuration for a presentation) to be created on the media server 24. The control service identifies the Live Capture workstation by authenticating the request, and creates a publishing point for the video in the live mode.

The viewer module includes ASP pages that help in viewing the Web Presentation by end users or the audience. The viewer module includes two views. The first view is a Presentation Card View that displays a summary of the web presentation. The Presentation Card contains links that when selected change the presentation mode to the Viewer mode. The second view is a Viewer view that plays back the web presentation. The web presentation is comprised of audio, video, images, web content and synchronization between video and images.

The start page for every presentation points to the presentation card view. The presentation card view displays the following information: Presentation Title, Event, Presenter Name, Presenter Date, Presenter Time, Length of Presentation, and Presentation Description. The presentation card view contains the following links: Speaker Biography, Presentation Notes, Help for Navigator, and a link to play back the presentation in the viewer.

The video in a video window is displayed using the Windows Media Player ActiveX Control. Control buttons can include Play, Pause, and Stop.

The viewer displays a Command bar for audience interaction and navigation control. The following buttons are available: Poll, Ask, Slide Show, Slide List, Help, Options, and Close. In the Live Mode, viewers are able to participate in polls. However, participating in polls is disabled in the on-demand mode. On clicking the Poll button, all Polls for a presentation are listed in a pop-up window, and the results for each poll are displayed in a graphical form after selecting a poll listing entry. On selecting the Ask button, a form pops-up for a user to pose a question to the presenter. The user types in a question, enters the subject matter and optionally enters his/her email address. Polls and Questions are handled by moderators at the Live Administrator end.

In the live mode, synchronization between the video and images is managed through a combination of media scripts and browser events generated by the Media Player in response to the "scriptCommand" event. In the On-demand mode, synchronization between the video and images is managed through a combination of media markers and scripts in the media header as related previously.

Markers are used for navigation. Scripts are used for synchronized slides.

When playing back the presentation, the duration of the media clip is generated from the timecode where the "End-Presentation" marker occurs, as opposed to the duration of the clip. This ensures that the presentation end occurs correctly, since the live mode capture encodes 60 seconds of additional video at the end of the presentation to offset for differences in video stream lag between separate webcasts from the media server 24.

The Viewer displays the presentation card. This is displayed in a scrollable frame window. The following information is displayed: Event, Presentation Name, Presenter, Air Date, Air Time, Length (Duration), and Description.

Figure 4:
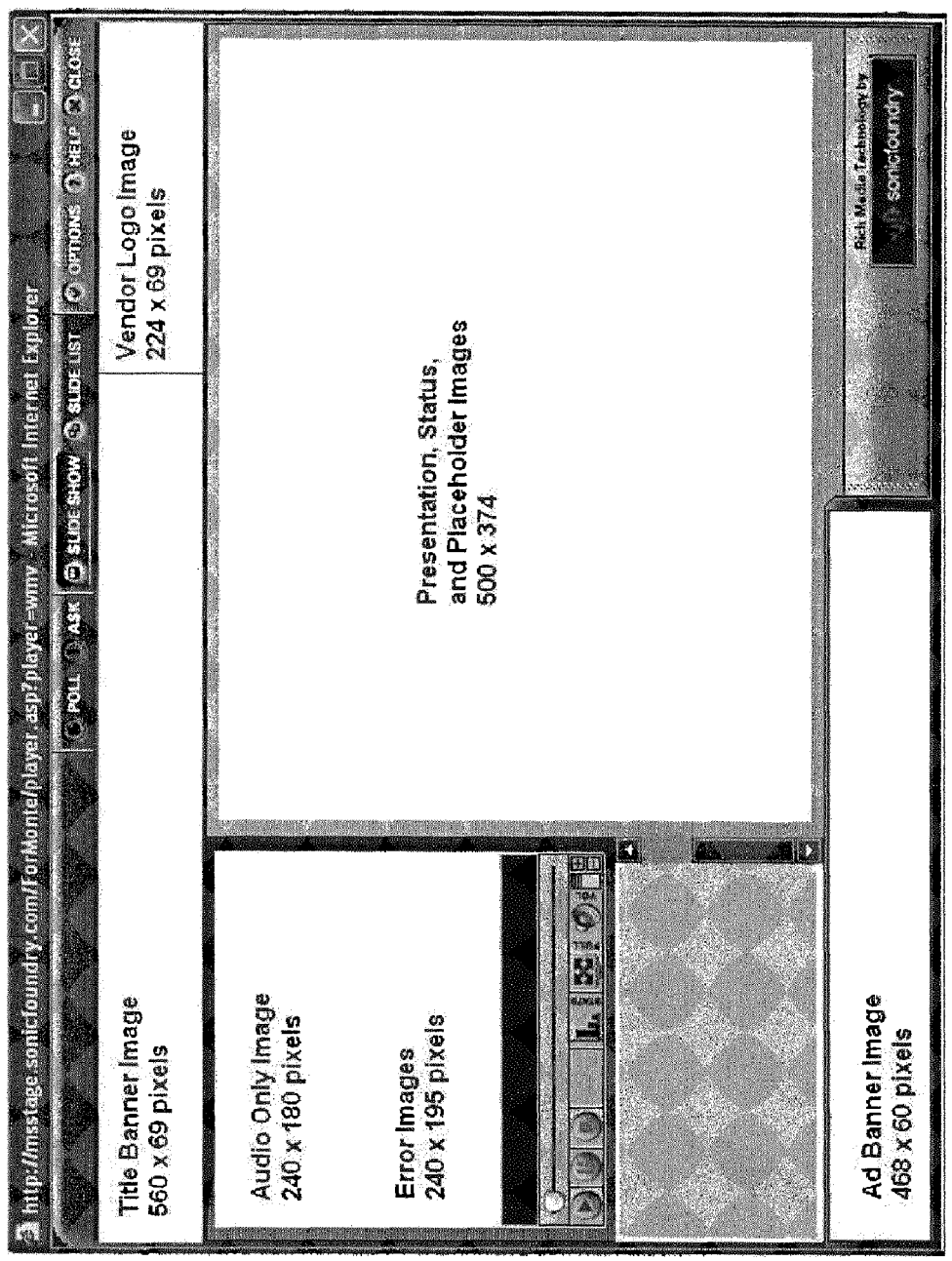
FIG. 4 is a screen display presented by a viewer module in the presentation system of FIG. 1.

FIG. 4 illustrates a screen display presented by the viewer module. The Ad Banner Image, Title Banner Image, and Vendor Logo Images are customizable. The customization is supported through Live Administration's Navigator Templates configuration. Each of the Ad Banner Image, Title Banner Image and Vendor Logo has associated with it a URL for retrieval of that image and defined through the administration's Navigator Templates configuration. The remaining sections of the application as shown in FIG. 4 indicate where the audio, video, and graphical data appear when transmitted to the user.

This detailed description outlines exemplary embodiments of a rich media event production method and system including the capturing, indexing, and synchronizing of RGB-based graphic content. In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A method for capturing and presenting a presentation, the method comprising:
   capturing image content associated with a presentation via a video capture device;
   capturing RGB content associated with the presentation via an RGB content capture device, wherein image content is presented at a lower capture rate than the RGB content;
   synchronizing the captured image content and the captured RGB content by associating the image content with a plurality of indicators and marking the RGB content with the plurality of indicators; and
   making the synchronized images and RGB content accessible to a viewer during or after the presentation including presenting a first image of the image content when presented RGB content is marked with a first indicator, wherein the first image is associated with the first indicator.

2. The method of claim 1, wherein the video capture device comprises a digital video capture card.

3. The method of claim 1, wherein the video capture device comprises an analog video capture card.

4. The method of claim 1, wherein the RGB content capture device comprises a VGA capture card.

5. The method of claim 1, wherein the RGB content capture device comprises a scan converter.

6. The method of claim 1, further comprising sharpening the captured RGB content according to an image sharpening factor such that text and objects in the captured RGB content are more clearly defined.

7. The method of claim 6, wherein the image sharpening factor is selectable via a slider control.

8. The method of claim 1, further comprising capturing audio associated with the presentation via an audio capture device.

9. An apparatus for capturing a presentation, the apparatus comprising:
   an audio receiving component capable of receiving audio associated with a presentation, wherein the audio is captured through an audio capture device;

an RGB content receiving component capable of receiving RGB content associated with the presentation, wherein the RGB content is captured through an RGB content capture device;

a synchronization component capable of synchronizing the received audio and the received RGB content by associating the received RGB content with a plurality of indicators and marking the received audio with the plurality of indicators; and a presenting component capable of making the synchronized audio and RGB content accessible to a viewer during or after the presentation including presenting a first image of the received RGB content when synchronized audio is marked with a first indicator, wherein the first image associated with the first indicator.

10. The apparatus of claim 9, further comprising a video receiving component capable of receiving images associated with the presentation, wherein the images are captured through a video capture device.

11. The apparatus of claim 10, wherein the synchronization component is further capable of synchronizing the received images along with the received audio and the received RGB content.

12. The apparatus of claim 11, wherein the presenting component is further capable of making the synchronized images, audio, and RGB content accessible to the viewer during or after the presentation.

13. The apparatus of claim 9, wherein the apparatus comprises a dedicated application machine.

14. A computer-readable medium having computer-readable instructions stored thereon that, upon execution by a processor, cause the processor to capture a presentation, the instructions comprising:

capturing image content associated with a presentation via a video capture device;

capturing RGB content associated with the presentation via an RGB content capture device;

associating a segment of the RGB content with at least one image of the image content; and providing the RGB content and the image content to a presentation server, wherein the at least one image is provided to the presentation server when the segment of the RGB content is provided.

15. The computer-readable medium of claim 14, wherein the instructions further comprise capturing audio associated with the presentation via an audio capture device.

16. The computer-readable medium of claim 14, further comprising sharpening the captured RGB content according to an image sharpening factor such that text and objects in the captured RGB content are more clearly defined.

17. The computer-readable medium of claim 14, wherein the RGB content capture device comprises a VGA capture card.

18. The computer-readable medium of claim 14, further comprising encoding the captured images to multiple bit rates.

19. The computer-readable medium of claim 14, further comprising sequentially encoding the captured RGB content.

20. The computer-readable medium of claim 14, further comprising progressively encoding the captured RGB content.

* * * * *

UNITED STATES PATENT AND TRADEMARK OFFICE
CERTIFICATE OF CORRECTION

PATENT NO. : 7,913,156 B2
APPLICATION NO. : 11/564061
DATED : March 22, 2011
INVENTOR(S) : James Dias et al.

It is certified that error appears in the above-identified patent and that said Letters Patent is hereby corrected as shown below:

ON THE FRONT FACE OF THE PATENT

In the Inventor section amend Inventor information as follows:

(75)  Inventors:  James Dias, Madison, WI (US)
Shankara ~~Subranmanian~~ Subramanian, Madison, WI (US)

Signed and Sealed this

Seventh Day of February, 2012

David J. Kappos
*Director of the United States Patent and Trademark Office*

UNITED STATES PATENT AND TRADEMARK OFFICE
Certificate

Patent No. 7,913,156 B2                                                Patented: March 22, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: James Dias, Madison, WI (US); Shankara Subranmanian, Madison, WI (US); and Krishna V. Pendyala, Allison Park, PA (US).

Signed and Sealed this Eighth Day of January 2013.

*STEPHEN WONG*
*Supervisory Patent Examiner*
Art Unit 2178
Technology Center 2100

UNITED STATES PATENT AND TRADEMARK OFFICE
Certificate

Patent No. 7,913,156 B2                                                             Patented: March 22, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: James Dias, Madison, WI (US); Shankara Subramanian, Madison, WI (US); and Krishna V. Pendyala, Allison Park, PA (US).

Signed and Sealed this Nineteenth Day of February 2013.

*STEPHEN HONG*
*Supervisory Patent Examiner*
*Art Unit 2178*
*Technology Center 2100*